US009113186B2

(12) United States Patent
Straub

(10) Patent No.: US 9,113,186 B2
(45) Date of Patent: *Aug. 18, 2015

(54) PROVIDING SYNDICATION FEED CONTENT ON A TELEVISION SET-TOP BOX WITH LIMITED DECODER CAPABILITY

(71) Applicant: Time Warner Cable Enterprises LLC, New York, NY (US)

(72) Inventor: Albert W. Straub, Westminster, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,866

(22) Filed: Sep. 8, 2013

(65) Prior Publication Data
US 2014/0013366 A1 Jan. 9, 2014

Related U.S. Application Data

(63) Continuation of application No. 12/618,986, filed on Nov. 16, 2009, now Pat. No. 8,533,768.

(60) Provisional application No. 61/184,412, filed on Jun. 5, 2009.

(51) Int. Cl.
*H04N 21/27* (2011.01)
*H04N 21/434* (2011.01)
(Continued)

(52) U.S. Cl.
CPC .......... *H04N 21/27* (2013.01); *H04N 21/4349* (2013.01); *H04N 21/4722* (2013.01); *H04N 21/818* (2013.01); *H04N 21/8173* (2013.01)

(58) Field of Classification Search
CPC ............ H04N 21/222; H04N 21/2223; H04N 21/231; H04N 21/2393; H04N 21/2183; H04N 21/27; H04N 21/223; H04N 21/4349; H04N 21/4722; H04N 21/8173; H04N 21/818
USPC ............. 725/62, 63, 86–87, 91–92, 100, 111, 725/114, 131
See application file for complete search history.

(56) References Cited

U.S. PATENT DOCUMENTS 7,500,235 B2 * 3/2009 Maynard et al. .............. 717/172
8,533,771 B2 9/2013 Straub
(Continued)

OTHER PUBLICATIONS

OpenCable Application Platform Specs, OCAP 1.1 Profile, OC-SP-OCAP1.1.1-090612, downloaded from http://www.cablelabs.com/specifications/OC-SP-OCAP1.1.1-090612.pdf, pp. 1-257 on Oct. 16, 2010.

(Continued)

*Primary Examiner* — Hai V Tran
(74) *Attorney, Agent, or Firm* — Otterstedt, Ellenbogen & Kammer, LLP

(57) ABSTRACT

Techniques are afforded for providing syndication feed content on a television STB with limited decoder capability. A request is initiated for syndication feed content from a networked content source through the STB. The syndication feed content is obtained through a proxy device in communication with the networked content source. When the syndication feed content is in a first format usable by the STB, the proxy device passes the syndication feed content in the first format to the STB. When the syndication feed content is in a second format unusable by the STB, the syndication feed content is first converted from the second format to the first format usable by the STB and then the syndication feed content is passed, in the first format, to the STB.

19 Claims, 11 Drawing Sheets

(51) Int. Cl.
*H04N 21/4722* (2011.01)
*H04N 21/81* (2011.01)

(56) References Cited

U.S. PATENT DOCUMENTS

| | | | |
|---|---|---|---|
| 8,688,801 B2 * | 4/2014 | Issa | 709/217 |
| 2003/0145047 A1 * | 7/2003 | Upton | 709/203 |
| 2005/0055685 A1 * | 3/2005 | Maynard et al. | 717/170 |
| 2005/0165615 A1 * | 7/2005 | Minar | 705/1 |
| 2005/0182792 A1 * | 8/2005 | Israel et al. | 707/104.1 |
| 2006/0265427 A1 * | 11/2006 | Cohen et al. | 707/200 |
| 2007/0071322 A1 * | 3/2007 | Maltagliati et al. | 382/181 |
| 2007/0118873 A1 * | 5/2007 | Houh et al. | 725/136 |
| 2007/0121651 A1 * | 5/2007 | Casey et al. | 370/401 |
| 2007/0162165 A1 * | 7/2007 | Stirbu et al. | 700/65 |
| 2007/0214477 A1 * | 9/2007 | Read | 725/38 |
| 2008/0134165 A1 * | 6/2008 | Anderson et al. | 717/173 |
| 2008/0209483 A1 * | 8/2008 | Lemmers et al. | 725/105 |
| 2008/0275974 A1 * | 11/2008 | Rackiewicz | 709/223 |
| 2008/0288458 A1 * | 11/2008 | Sun et al. | 707/3 |
| 2009/0025045 A1 * | 1/2009 | Kliegman et al. | 725/87 |
| 2009/0043815 A1 * | 2/2009 | Lee et al. | 707/104.1 |
| 2009/0183219 A1 * | 7/2009 | Maynard et al. | 725/116 |
| 2009/0235283 A1 * | 9/2009 | Kim et al. | 719/328 |
| 2009/0248794 A1 * | 10/2009 | Helms et al. | 709/203 |
| 2009/0249467 A1 * | 10/2009 | Webb-Johnson | 726/12 |
| 2010/0205169 A1 * | 8/2010 | Narayan et al. | 707/711 |
| 2010/0313223 A1 | 12/2010 | Straub | |

OTHER PUBLICATIONS

OpenCable™ Specifications, Common Download 2.0, OC-SP-CDL2.0-I08-090206, downloaded from http://www.cablelabs.com/specifications/OC-SP-CDL2.0-I08-090206.pdf on Oct. 16, 2010.

* cited by examiner

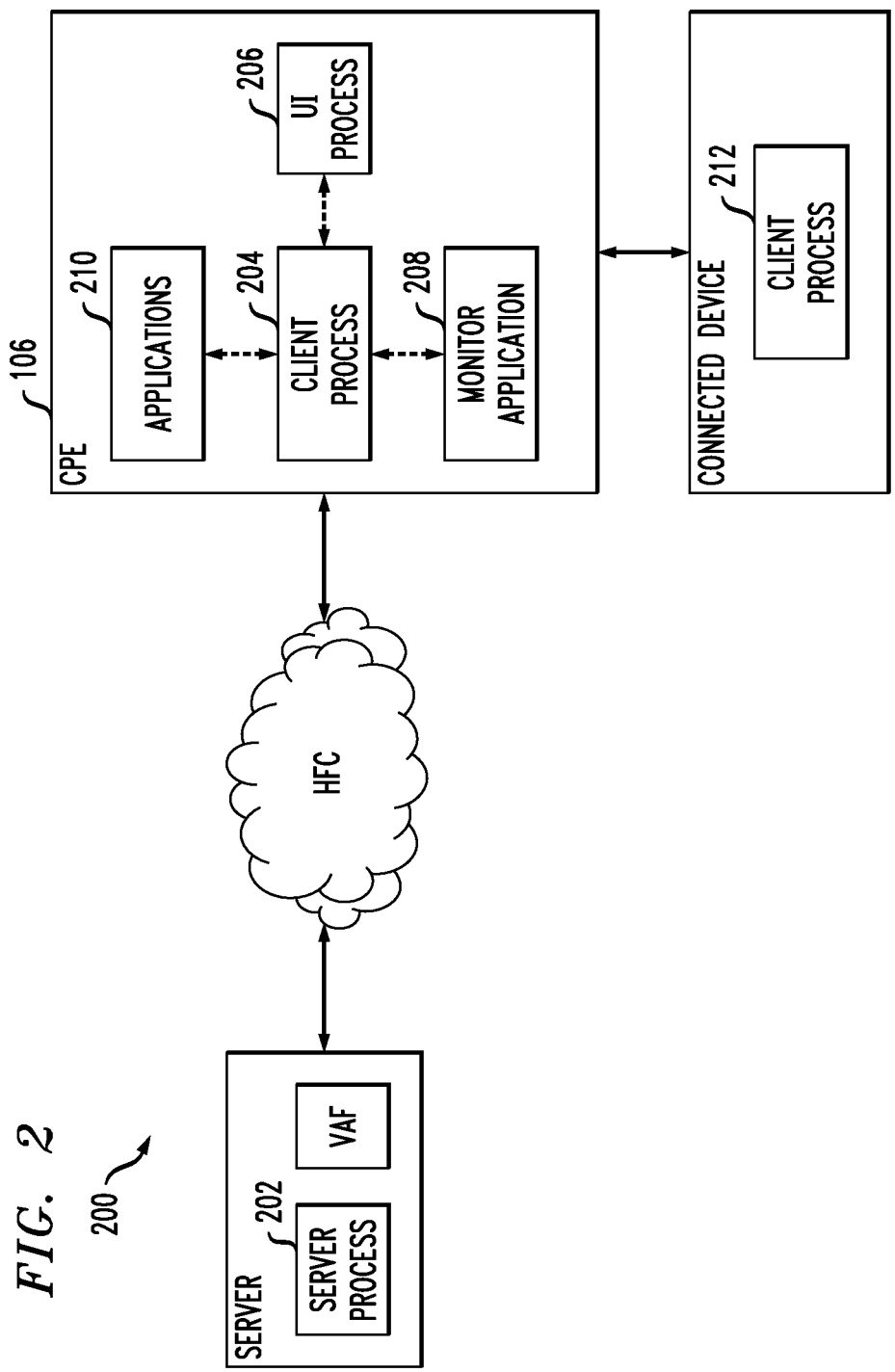

PROVIDING SYNDICATION FEED CONTENT ON A TELEVISION SET-TOP BOX WITH LIMITED DECODER CAPABILITY

CROSS-REFERENCE TO RELATED APPLICATION(S)

This application is a divisional of U.S. application Ser. No. 12/618,986 filed Nov. 16, 2009, which in turn claims the benefit of U.S. Provisional Application Ser. No. 61/184,412, filed on Jun. 5, 2009. The complete disclosures of U.S. application Ser. No. 12/618,986 and U.S. Provisional Application Ser. No. 61/184,412 are both expressly incorporated herein by reference in their entireties for all purposes.

FIELD OF THE INVENTION

The present invention relates generally to the electrical, electronic, and computer arts, and more particularly relates to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG2) standard. The MPEG2 standard specifies, among other things, the methodologies for video and audio data compression allowing for multiple programs, with different video and audio feeds, to be multiplexed in a transport stream traversing a single transmission channel. A digital TV receiver may be used to decode an MPEG2 encoded transport stream, and extract the desired program therefrom.

SUMMARY OF THE INVENTION

Techniques are further provided for providing syndication feeds (e.g., video podcast content delivered via Atom or Really Simple Syndication (RSS) feeds, etc.), in addition to other video and/or audio content, on a television set-top box (STB) with limited decoder capability. Techniques are further afforded for providing syndication feeds on a vehicle entertainment device, or alternative mobile computing device, via Universal Plug-n-Play (UPnP), or an alternative connection format.

In accordance with one embodiment of the invention, a method for providing syndication feed content on a television STB with limited decoder capability includes the steps of: initiating a request for syndication feed content from a networked content source; obtaining, through a proxy device in communication with the networked content source, the syndication feed content; when the syndication feed content is in a first format usable by the STB, the proxy device passing the syndication feed content in the first format to the STB; and when the syndication feed content is in a second format unusable by the STB, converting the syndication feed content from the second format to the first format usable by the STB, and passing the syndication feed content in the first format to the STB.

In accordance with another embodiment of the invention, a system is provided including a STB having a STB memory and at least one STB processor coupled to the STB memory, a networked content source in communication with the STB, the networked content source including syndication feed content stored thereon, and a proxy device coupled between the STB and the networked content source. The proxy device includes a proxy device memory and at least one proxy device processor coupled to the proxy device memory for facilitating a transfer of data between the networked content source and the STB. The system further includes a media converter operatively coupled to the proxy device and having a media converter memory and at least one media converter processor coupled to the media converter memory.

The STB processor, the media converter processor and the proxy device processor are cooperatively operative: to initiate a request for syndication feed content from the networked content source; to obtain, through the proxy device, the syndication feed content; when the syndication feed content is in a first format usable by the STB, to pass the syndication feed content in the first format to the STB; and, when the syndication feed content is in a second format unusable by the STB, to convert the syndication feed content from the second format to the first format usable by the STB and to pass the syndication feed content in the first format to the STB.

In accordance with yet another embodiment of the invention, a method for transferring syndication feed content between a first device residing in a first location and a second device residing in a second location includes the steps of: establishing a communication channel between the first and second devices for transferring information between the first and second devices; the first device receiving a request to transfer at least a portion of the syndication feed content stored on the first device in a first format, the first format being different than a format of the syndication feed content obtained by the first device from a networked content source; the first device converting the syndication feed content from the first format to a second format usable by the second device, the converting comprising modifying at least a portion of metadata in the syndication feed so that the metadata no longer references content stored on the networked content source but references content stored locally on the first device; and transferring at least a portion of the syndication feed content stored in the first device in the first format to the second device in the second format.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may have one or more of the following advantages:

Techniques of the invention beneficially allow cable system technology, with limited decoder capability, to access a variety of content that is encoded in various, incompatible formats.

Techniques of the invention beneficially provide a caching mechanism for content that is in demand so that it does not need to be transcoded multiple times.

Techniques of the invention automatically modify syndication XML meta-data to point to modified content that is more easily accessible due to it being cached in the head end.

Techniques of the invention automatically convert syndication XML meta-data into a meta-data format useable by a video on-demand (VOD) system, thereby eliminating the need to have the data re-entered manually.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2 illustrates one exemplary embodiment of a generalized software provisioning architecture;

DETAILED DESCRIPTION OF PREFERRED EMBODIMENTS

Figure 1:
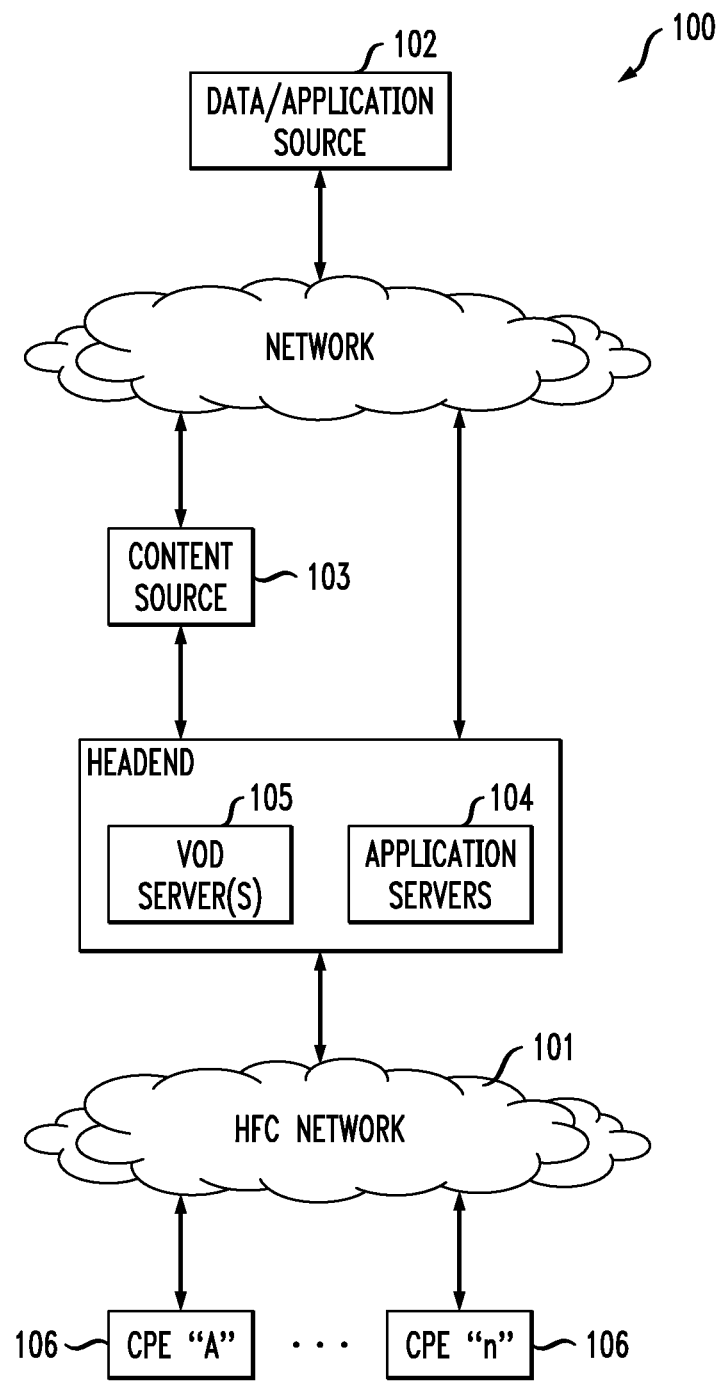
FIG. 1 is a functional block diagram illustrating an exemplary hybrid fiber-coaxial (HFC) network configuration useful with one or more embodiments of the present invention.

Initially, the complete disclosure of United States Patent Application Publication 2008/0134165 of Anderson et al. entitled "Methods and apparatus for software provisioning of a network device," published on Jun. 5, 2008, is expressly incorporated herein by reference in its entirety for all purposes. FIG. 1 illustrates a typical content-based network configuration 100 with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. The distribution server(s) 104, VOD servers 105 and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

It is to be understood that the apparatus and methods presented herein are merely non-limiting, illustrative embodiments and/or applications of the present invention. For example, it should be noted at this point that in addition to a conventional HFC network or a switched digital network to be discussed below, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104. This can include, for example, a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts, and accordingly are not described further herein.

The VOD server 105 comprises a computer system where on-demand content can be received from one or more of the aforementioned data sources 102 and enter the network system. These servers may generate the content locally, or alternatively may act as a gateway or intermediary from a distant source.

The CPE 106 includes any equipment in the customers' premises (or other appropriate locations) that can be accessed by a distribution server 104.

Figure 1A:
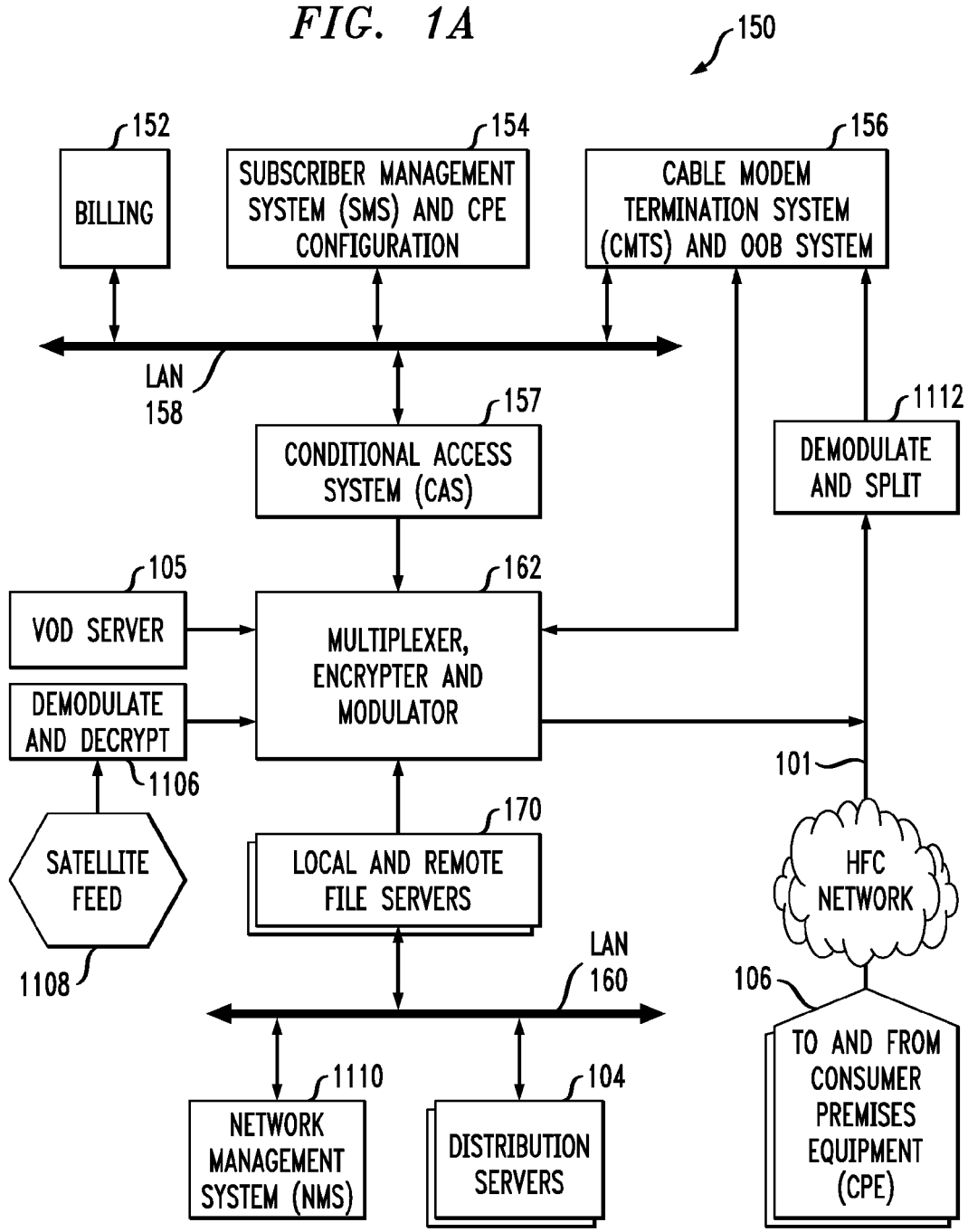
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the headend configuration depicted in FIG. 1*a* is high-level, conceptual architecture and that each multi-service operator or multiple system operator (MSO) may have multiple headends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the headend should be adapted to acquire the information for the carried channels from various sources. Typically, the channels being delivered from the headend 150 to the CPE 106 ("downstream") are multiplexed together in the headend and sent to neighborhood hubs (see FIG. 1*b*) via a variety of interposed network components.

Content (e.g., audio, video, etc.) is provided in each downstream (in-band) channel associated with the relevant service group. To communicate with the headend or intermediary node (e.g., hub server), the CPE 106 may use the OOB or DOCSIS® (Data Over Cable Service Interface Specification, a registered trademark of Cable Television Laboratories, Inc., 400 Centennial Parkway, Louisville, Colo. 80027, USA) channels and associated protocols. The OpenCable™ Application Platform (OCAP) 1.0, 2.0, 3.0 (and subsequent) specification (OpenCable is a trademark of Cable Television Laboratories, Inc.) provides for exemplary networking protocols both downstream and upstream, although the invention is in no way limited to these specific approaches.

It will also be recognized that multiple servers (broadcast, VOD, or otherwise) can be used and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers, each disposed at a different location, are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
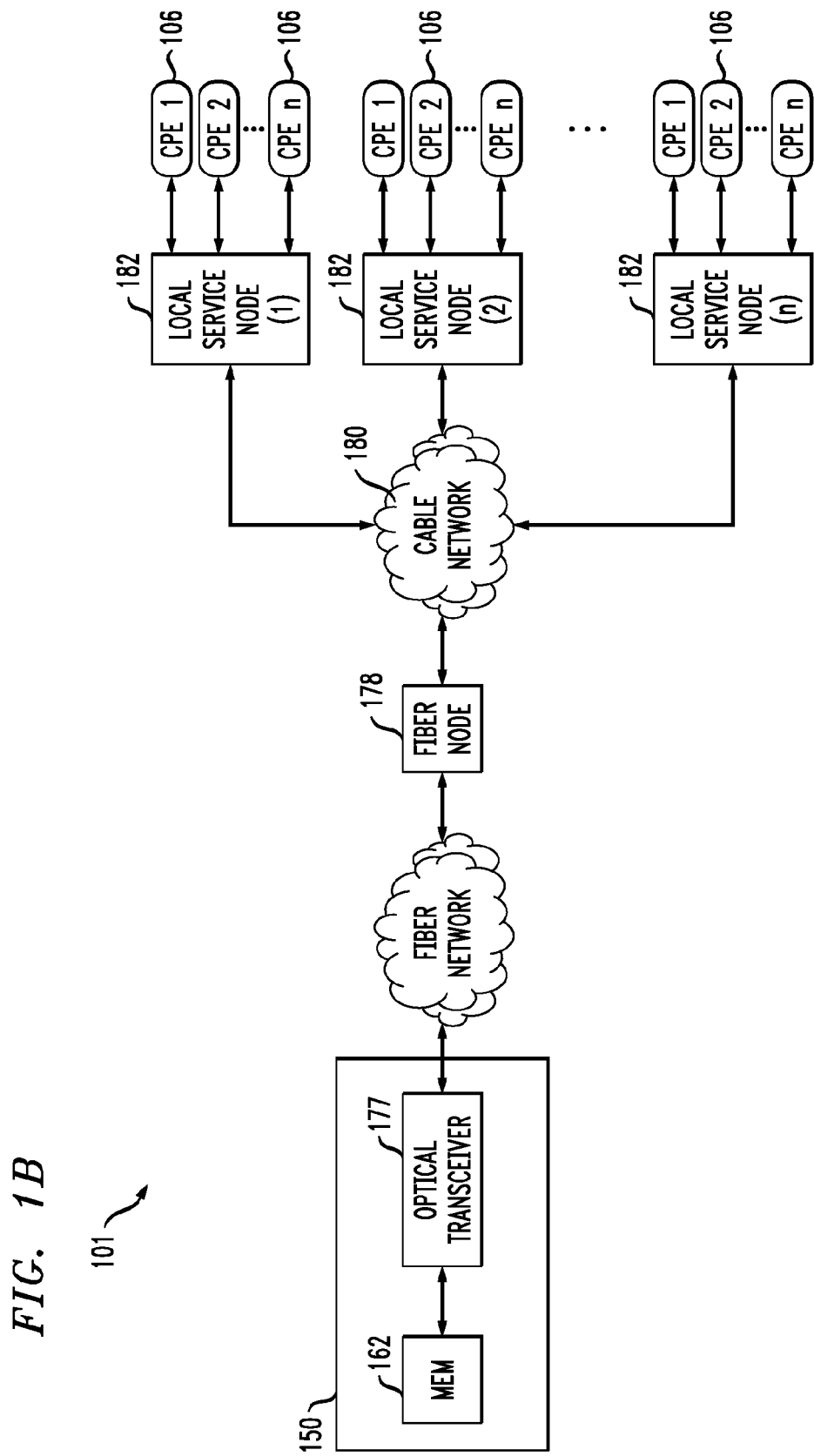
FIG. 1b is a functional block diagram illustrating one exemplary local service node configuration useful with the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
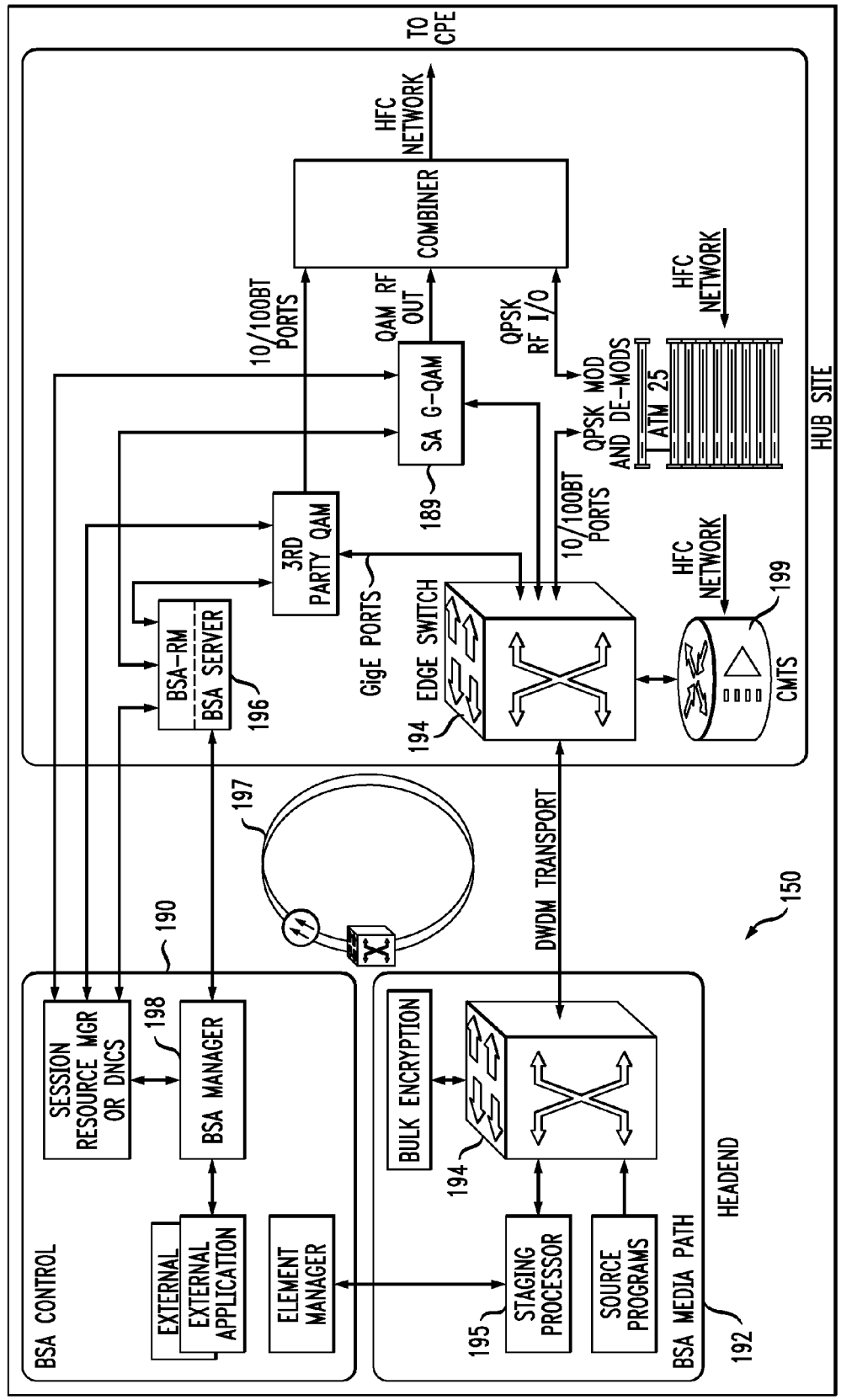
FIG. 1c is a functional block diagram illustrating one exemplary broadcast switched architecture (BSA) network useful with the present invention.

FIG. 1*c* illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows implementation details of one exemplary embodiment of this broadcast switched network architecture. Specifically, the headend 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is expressly incorporated herein by reference in its entirety for all purposes, describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1*a*-1*c* may also deliver Internet data services using the Internet Protocol (IP), although other protocols and transport mechanisms of the type well known in the digital communication art may be substituted. One exemplary delivery paradigm comprises delivering MPEG-based video content, with the video transported to user personal computers (PCs) (or IP-based STBs) over DOCSIS channels comprising MPEG (or other video codec such as H.264 or AVC) over IP over MPEG. That is, the higher layer MPEG- or other encoded content is encapsulated using an IP format, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1*c* can, in the most general case, be the same or different as that shown in the hub site of FIG. 1c. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-1c are exemplary in nature and different approaches may be used in other embodiments; such other approaches may have more or less functionality (for example, high speed Internet data services might be omitted in some cases).

FIG. 2 illustrates one exemplary embodiment of a generalized software provisioning architecture. As shown in FIG. 2, the architecture 200 includes a "server" process 202, which may be disposed for example on a server or other device at the headend 150 of the network, at a BSA switching hub (see FIG. 1c), or yet other locations as desired. The server functionality may be integrated with one or more other existing components (e.g., an application server 104 as shown in FIG. 1). By disposing the server process 202 at the headend, BSA hub, or some other node with connectivity to multiple CPE, the server process can advantageously service and provision multiple CPE 106 simultaneously.

The "server" functionality may be provided by a number of existing components and/or processes already in place within the network, such as for example use of existing messaging facilities to generate and deliver the update messages, the use of a carousel function to select and download applications or other components, and so forth. Each of the foregoing features is described in greater detail subsequently herein.

As shown in FIG. 2, a corresponding client process 204 is disposed on each CPE 106 (or a selected subset of all CPE); this process allows the CPE 106 to receive/send information from/to the server process 202, for e.g., determining the need for provisioning, remote configuration and provisioning of the CPE 106, monitoring of operations, statistics, status information, and the like. In one exemplary embodiment, the client process 204 is a "bootstrap" program or module that is installed on the CPE 106 and adapted to operate under certain circumstances.

The client portion 204 may also be in logical communication with other processes within the CPE 106, such as for example an OCAP-compliant monitor application or middleware 208, a user interface (UI) (and configuration) process 206, other applications 210 running on the CPE, and the like. Client processes 212 on other devices, such as a device coupled to the CPE 106 via a wireless or wired networking interface, can also communicate with the client process 204 if desired.

The CPE 106 may also include various other processes, such as a media server, web or http server, and so forth. These can be used in a stand-alone fashion (e.g., where a personal media device (PMD) in the premises network merely accesses the media server in order to obtain stored personal content from the CPE 106), or as a local proxy for other distant servers (such as a remote third party web server, and the like). Moreover, the CPE may take any number of forms, including for example a set-top box (e.g., DSTB); a converged device or "hive" as disclosed in US Patent Publication 2007/0217436 of Markley et al, entitled "Methods and apparatus for centralized content and data delivery," the complete disclosure of which is expressly incorporated herein by reference in its entirety for all purposes; a wireless satellite receiver; or even a mobile wireless device in direct or indirect data communication with the operator network domain.

Figure 3:
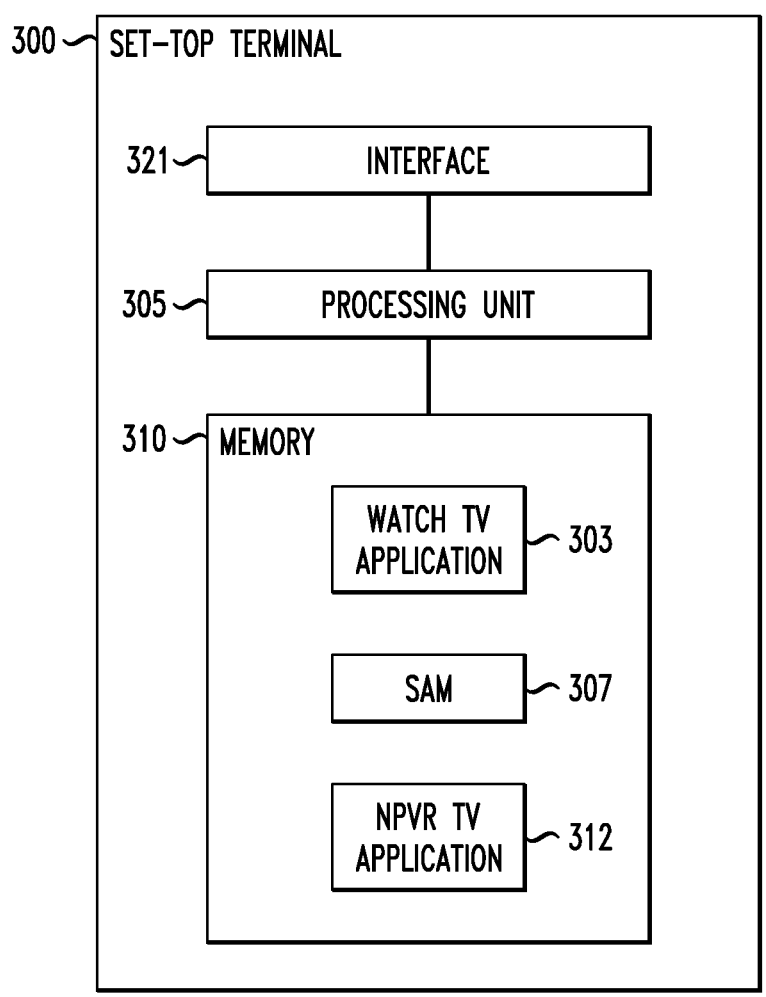
FIG. 3 is a functional block diagram of one exemplary embodiment of a set-top terminal (or set-top box), which may be used in an illustrative implementation of the consumer (or customer) premises equipment shown in FIG. 1.

FIG. 3 is a functional block diagram of one exemplary embodiment of a set-top terminal (or STB) 300, which may be used in an illustrative implementation of the CPE 106 shown in FIG. 1. As shown in FIG. 3, a processing unit 305 resident on the set-top terminal 300 is in data communication with an interface 321, which may be a network interface, and memory 310, or an alternative storage device. Processing unit 305 orchestrates the operations of set-top terminal 300. It executes instructions stored in memory 310, typically under the control of an operating system. Service application manager (SAM) 307 forms part of such an operating system of set-top terminal 300. SAM 307 is responsible for, among other things, monitoring channel change events; administering channel, service and other tables in terminal 300; and maintaining a registry of applications in terminal 300. One such application running on set-top terminal 300 may be a Watch TV application 303 which is invoked to service a traditional broadcast channel (or program). Another application may be a network personal video recorder (NPVR) TV application 312 which is invoked to service NPVR-enabled channels (or programs), and which may be downloaded from the headend (e.g., 105 in FIG. 1) to memory 310. It is to be appreciated that while only two applications are shown resident in memory 310, the invention is not limited to any particular number of applications that may reside in memory 310 or run on set-top terminal 300.

The interface 321 manages data transmitted and received over, e.g., the HFC Network (101 in FIG. 1). Depending on the network topology and delivery mechanism used, the interface 321 may comprise any number of different modalities including without limitation a radio frequency tuner stage (and de-multiplexer (demux)) of the type well known in the art, a DOCSIS or other cable modem, an IP interface, IEEE 802.3 Ethernet interface, IEEE 802.11 Wi-Fi interface, and so forth. The data, applications, or content received by the set-top terminal 300 via the interface 321 is stored in memory 310.

In one embodiment, memory 321 comprises a non-volatile memory device such as, for example, a hard disk that is in data communication with the processing unit 305. Resident on memory 310 is preferably a bootstrap application, a monitor application, a file registry, and optionally, one or more of the application versions of one or more software applications 303, 312 previously described. The exemplary file registry is a table of numeric entries assigned to each of the application versions of each of the software applications 303, 312 currently installed in the set-top terminal 300 or connected devices. The aforementioned Anderson et al. Publication 2008/0134165 describes a bootstrap application and a monitor application, which, given the teachings herein, may be modified by the skilled artisan for use with one or more embodiments of the invention.

Really Simple Syndication (RSS) comprises a family of web-based syndication feed formats. Syndication feeds, in general, are used primarily for publishing frequently updated information, such as, but not limited to, news headlines, podcasts and blog entries, in a standardized format. Although a web-based syndication feed format could be anything transported over HTTP, such as, for example, HyperText markup language (HTML) or JavaScript, it is more commonly extensible markup language (XML). The two main families of web-based syndication feed formats are RSS and Atom. A RSS document may include summarized text and metadata (e.g., publish date and authorship), and may include additional information as well. RSS web feeds benefit publishers, by letting them syndicate content automatically, and readers, who want to obtain timely updates from favored websites or to aggregate feeds from multiple sites into one place. The phrase "syndication feed content" as used herein is intended to broadly refer to any content that may be included in a syndication feed.

RSS feeds can be read using software called a "RSS reader," "feed reader," or "aggregator," which can be, for example, web-based, desktop-based, or mobile-device-based. A user typically subscribes to a given feed by entering into the reader a uniform resource identifier (URI), often referred to informally as a "URL" (uniform resource locator) associated with the feed, or by clicking an RSS icon in a browser that initiates the subscription process. The RSS reader checks the user's subscribed feeds regularly for new work, downloads any updates that it finds, and provides a user interface to monitor and read the feeds. RSS formats are generally specified using XML.

It is common practice to use a RSS system to obtain video assets to play on mobile and computing devices (e.g., personal digital assistant (PDA), cell phone, etc.). The device reads an XML file that contains RSS data. The device displays the data to the user who can select the content that is desired. The device then downloads the content using the URL provided in the XML file and stores the content locally. The user may then play the content on the device. Content may be textual, audio, or video. In accordance with one or more embodiments of the invention, television STBs may also be used to provide the same service as the mobile or computing device.

Content retrieved from the Internet may be encoded in various formats, for example, Audio Video Interleave (AVI), beep media player (BMP), MPEG2, MPEG4, advanced video coding (AVC), MOV (Quick Time), and so on, to name but a few. A cable television STB typically contains a limited number of video and audio decoders. Consequently, the STB cannot render and present much of the content provided on the Internet, or other network, which might otherwise be accessed via RSS or an alternative syndication feed system. Furthermore, STBs are typically not hardened against attacks from malicious software on the Internet. Therefore, a STB cannot currently be connected directly to the Internet.

Figure 4:
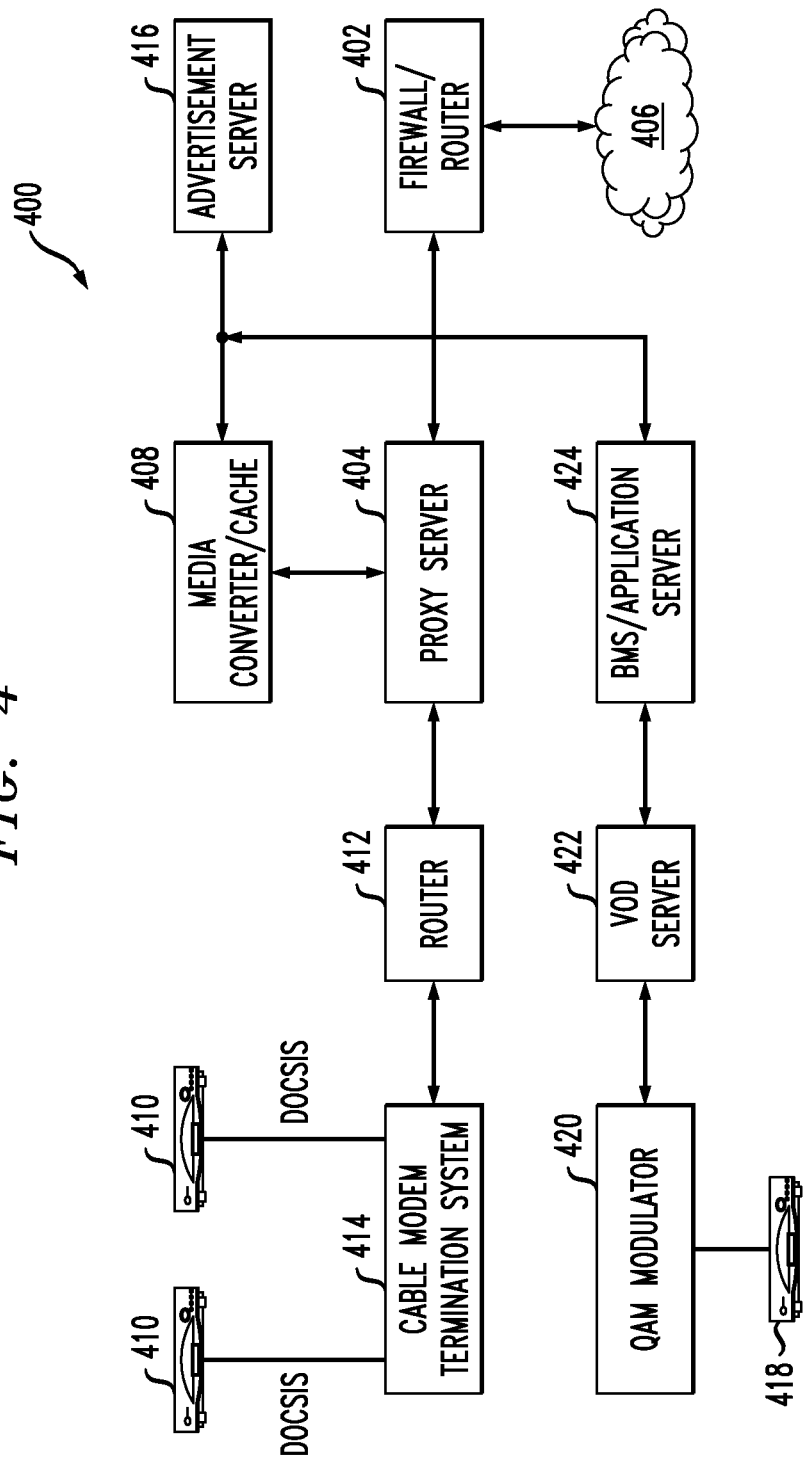
FIG. 4 is a functional block diagram depicting at least a portion of an exemplary system for viewing at least one syndication feed on CPE, such as a STB, according to an embodiment of the invention.

FIG. 4 is a functional block diagram depicting at least a portion of an exemplary system 400 for providing syndication feed content, which may include, for example, RSS, Atom, video podcast, etc., on CPE such as a STB, according to an embodiment of the invention. With reference to FIG. 4, system 400 preferably provides: a firewall/router 402 to aid in the prevention of attacks; a proxy server 404 that can be used to access media from the Internet 406, or other content source, and cache (i.e., store) it locally, the firewall/router 402 safely connecting proxy server 404 to the Internet 406; a media converter/cache server 408 that is operative to convert content in a first format, such as a format that is unusable by STBs 410, into a second format that is usable by the STBs 410; a network router 412 that diverts Internet requests to the proxy server 404; a Cable Modem Termination System (CMTS) 414 to provide IP access over the Cable System; Television STBs 410; and an optional advertisement insertion server 416.

STBs 410 are preferably DOCSIS enabled STBs that are capable of receiving OOB data through a DOCSIS cable modem internal to the STB. As is known by those skilled in the art, DOCSIS is a modulation scheme which uses radio frequency (RF) over cable networks to transfer information. It is to be appreciated, however, that any means of downloading IP content onto the STBs 410 is acceptable and similarly contemplated by the invention (e.g., Internet Protocol television (IPTV) STB). STBs 410 may be connected to CMTS 414 by, for example, respective DOCSIS links over a cable network, although other connection means are similarly contemplated by the invention.

Non-DOCSIS enabled STBs 418, which may be referred to herein as "legacy" STBs, may also be employed in conjunction with embodiments of the present invention. By way of illustration only and without limitation, legacy STB 418 is preferably coupled, via a QAM modulator 420, to a VOD server 422. The VOD server 422 is coupled to a business management support (BMS)/application server 424, or alternative processor, which is in turn coupled to the media converter/cache server 408. An illustrative description of a non-DOCSIS system data path will be presented in further detail below.

For an exemplary non-DOCSIS system, the media converter/cache server 408 preferably reads and parses an RSS file received from the Internet 406 via proxy server 404 and firewall/router 402. The media converter/cache server 408 finds the video content described in the RSS file and similarly retrieves the video files from the Internet 406. Media converter/cache server 408 translates the retrieved video files into MPEG-2 format, which is readable by the legacy STBs 418.

As previously stated, RSS is a Web content syndication format, as specified in the document entitled "RSS 2.0 Specification," Berkman Center for Internet & Society at Harvard Law School, July 2003, the disclosure of which is expressly incorporated herein by reference in its entirety for all purposes. RSS is a dialect of XML, and all RSS files must conform to XML 1.0, as described in the specification entitled "Extensible Markup Language (XML) 1.0," 5th Ed., Word Wide Web Consortium (W3C), November 2008, the disclosure of which is expressly incorporated herein by reference in its entirety for all purposes. An "item" is a part of the RSS specification; there can be multiple items in an RSS file.

Cable systems generally use a different XML file format to describe content, namely, Asset Distribution Interface (ADI) XML format. (e.g., as specified in the document entitled "CableLabs® Asset Distribution Interface Specification Version 1.1," Document Control No. MD-SP-ADI1.1-I04-060505, Rev. I04, May 2006, and subsequent revisions and extensions thereto, which is expressly incorporated herein by reference in its entirety for all purposes). ADI XML files may contain one piece of video content, and hence one item in a RSS file translates into one ADI XML file. An original cable VOD system provisions content by putting a MPEG2-formatted file on an FTP server. Such VOD system also places an ADI XML metadata file in the same directory as the MPEG2 file. Calling the VOD provisioning system will cause the VOD system to parse the ADI XML file and copy the content from the FTP server to the VOD server 422.

BMS/application server 424 preferably generates an ISA Asset object and calls a provision( )method on it with the location of the MPEG-2 file and ADI.XML file. As part of the process of provisioning, the calling of the BMS Asset.provision( )method transfers the MPEG-2 file to the VOD server 422 and places the ADI XML file metadata into a BMS Package object so that the description will be viewable from the application server 424. An exemplary application server 424 is Time Warner Cable's Mystro Application Server (MAS), although the invention is not limited to this specific server. The application server 424 preferably reads the descriptive text from a Package object and generates a data file (e.g., called a "catalog" in the MAS). For a Cisco system, for example, the file is placed on an RF file system that is a DSM-CC object carousel or HTTP server for newer OCAP/DOCSIS-enabled STBs.

The legacy STB 418 will initiate a VOD session from the VOD server 422, for example, via an Interactive Services Architecture (ISA) session setup protocol (SSP) with a SessionGateway object running on a business management support (BMS)/application server 424, or alternative processor. The SSP will allocate and return a frequency and program number to STB 418. The SSP also returns the IP address and port identification of a lightweight stream control protocol (LSCP) server residing within the VOD server 422. The legacy STB 418 then uses the LSCP to control the playback, fast forward, and rewind of a stream transmitted by the VOD server 422 as a MPEG transport stream on the prescribed program number/packet identifier (PID) combination. The VOD server 422 sends the MPEG stream to the QAM modulator 420 where it is transmitted at the frequency previously allocated by the SSP. QAM modulator 420 outputs at a fixed frequency. The legacy STB 418 tunes to the prescribed frequency and program number and decodes the video for presentation to the user.

Media converter/cache server 408 preferably parses the RSS feed and translates each item therein into multiple ADI XML files. The ADI XML files are provisioned by the BMS/application server 424 onto the VOD server 422. Additionally, the application server converts the ADI XML files into a format that is useable by an electronic program guide (EPG), or other software, on the legacy STB 418 so that the legacy STB can arrange and display the new content to the user for selection and playback.

In one or more embodiments, when accessing an RSS feed for the first time, the user preferably enters the URL of a desired RSS feed into the system 400 where it may be persisted. The system 400 contacts the proxy server 404, using the entered URL, to obtain the RSS file. The proxy server 404 safely retrieves the RSS file from the external server on the Internet 406 via firewall/router 402, or an alternative interface means. The proxy server 404 passes the RSS file to the media converter/cache server 408. Preferably, the media converter/cache server 408 parses the RSS file and determines which content is usable by the DOCSIS enabled STBs 410, if they are the target, and/or an older (i.e., legacy) Digital Audio-Visual Council (DAVIC) or Motorola proprietary OOB STB 418, which is not readily usable by the DOCSIS enabled STBs. The RSS file is preferably modified such that URLs within the RSS file that contain content which is unusable by the STB 410 are replaced with substitute URLs that point to the converter/cache server 408 where such content that is usable by the STB may be stored locally.

The modified RSS file is then passed to the STB 410, which is preferably DOCSIS enabled. If the final target is a non-DOCSIS enabled STB 418, then the converter/cache server 408 will translate the input RSS or Atom file into a form useable by the cable system VOD system, such as, for example, CableLabs® (a registered trademark of Cable Television Laboratories, Inc.) ADI XML format (e.g., specified in the document entitled "Metadata 2.0 Specifications, ADI 2.0 Specification Asset Structure," Document Control No. MD-SP-ADI2.0-AS-I03-070105, Rev. I03, Jan. 5, 2007, and subsequent revisions and extensions thereto, which is expressly incorporated herein by reference in its entirety for all purposes) or Interactive Services Architecture (ISA) (from Time Warner Cable, Inc.) ADI XML format. Using ISA, for instance, the RSS files are converted into a series of ADI files, one for each video content, as previously described. Other formats and protocols are similarly contemplated for use by the invention.

The converter/cache 408 will also convert the video content into a format useable by the VOD system and non-DOCSIS enabled STB 418 and provision the content and associated metadata into the system by signaling the VOD system application server. In this manner, a legacy, non-DOCSIS enabled STB can be treated as a VOD asset. Once provisioned onto the VOD system, the application server will perform steps to notify the STBs 410 and 418 through whatever mechanism it usually employs, including, for example, regeneration of data files and signaling of an update, etc.

In one embodiment, the contents of the RSS file are displayed to a user who then selects content. If the selected content is not in a format that is directly usable by the STB 410, then a modified link in the RSS document will cause the STB to attempt to read the content from the media converter/cache server 408. The converter/cache server 408 is preferably operative such that, upon request for content, it will retrieve the original content from the Internet 406 and pre-emptively transcode such content based on the STB retrieval of the RSS file from the external server, as well as utilize internal hardware transcoders to convert the file format in real time. The converted content is fed to the STB 410 from the media converter/cache server 408 where it is then preferably stored (e.g., buffered) on the STB and played back to the user.

In an alternative embodiment, the request for content may be in the form of a setting (e.g., timer-based) whereby the media converter/cache server 408 is configured to periodically check the RSS file to determine whether or not the RSS file has been updated since the last time it was checked. When it is determined that the RSS file has been updated, the media converter/cache server 408 automatically retrieves the contents of the RSS file and stores the contents on the VOD server 422 or makes the contents available in the cache (e.g., a RSS accumulator within the converter/cache server).

If the RSS file contains URLs linking to content on the Internet 406 that is directly usable by the STB 410, then the proxy server 404 will simply pass the request on to the server on the Internet and the content file will be passed back to the STB 410 with no conversion (e.g., transcoding) applied.

In accordance with another embodiment, content from the RSS file is presented through the existing VOD infrastructure by way of a conversion from a first format, which may be RSS or Atom format, to a second format, which may a cable standard format such as ADI. The user then selects the content as he or she would any other VOD content.

Additionally, the system 400 may comprise an optional advertisement server 416. The advertisement server 416 may be used to append advertisements or other information to, for example, the beginning and/or the end of the content that is converted and sent on to the STB 410. Advertising revenue received for the appended advertisements could be used to offset the cost of the media converter/cache server 408.

Another way to perform the conversion includes having a small Cable Network Termination Server (not explicitly shown) in the premises where the STB 410 is located. This server may be adapted to perform the caching and conversion locally. One non-limiting example of such a local server is CPE 106 as shown in FIG. 5.

Figure 5:
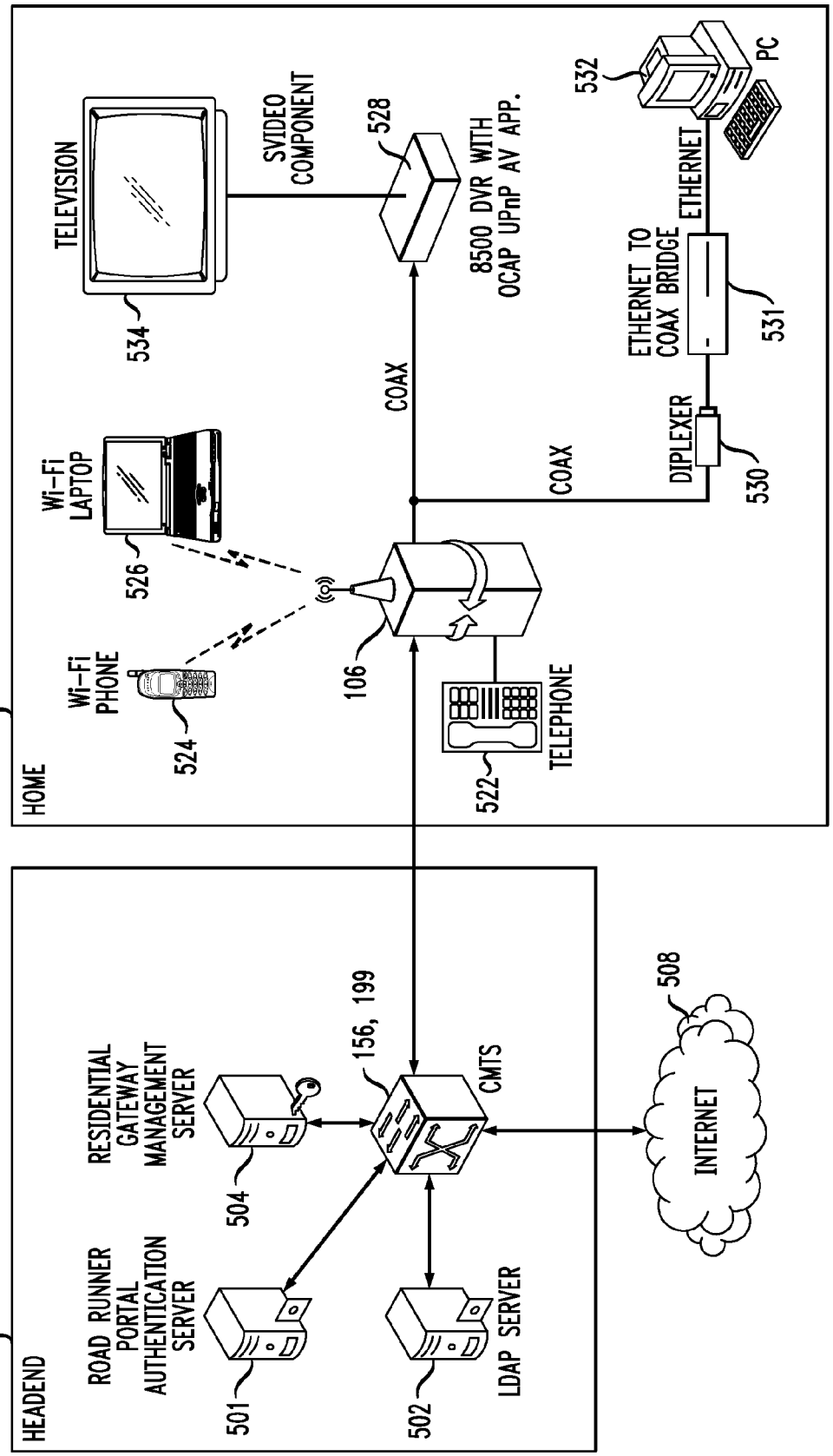
FIG. 5 is a block diagram of a premises network and associated operator-side network elements in which techniques of one or more embodiments of the present invention can be employed.

FIG. 5 is a block diagram of a premises network and associated operator-side network elements in which techniques of one or more embodiments of the present invention can be employed. A portal authentication server 501, a LDAP (Lightweight Directory Access Protocol) server 502, or an alternative authentication server (e.g., Microsoft Active Directory™, a trademark of Microsoft Corporation), and a gateway management server 504 are each coupled to a cable modem termination system (CMTS) 156, 199 of a type well known in the art. These components preferably reside at the headend 150 in the illustrated embodiment, although it will be appreciated that one or more of these components may be disposed at various other locations as desired consistent with the architecture implemented (e.g., at the BSA hub in a BSA network). The CMTS 156, 199 is coupled to a network 508, which may be the Internet, which is preferably located externally to the headend 150. A communication means such as, for example, an IP backbone or gateway (not explicitly shown) may be used for providing a connection between the CMTS 156, 199 and the network 508.

The CMTS 156, 199 is, in the illustrative embodiment of FIG. 5, coupled to multiple households or other premises, including the exemplary illustrated household 540. In particular, the CMTS 156, 199 is coupled via the aforementioned HFC network and local coaxial cable or fiber drop, or via alternative connection means, to the premises 540, including consumer premises equipment (CPE) 106. The exemplary CPE 106 is in signal communication with any number of different devices including, e.g., a wired telephony unit 522, a Wi-Fi or other wireless-enabled phone 524, a Wi-Fi or other wireless-enabled laptop 526, a session initiation protocol (SIP) phone, an H.323 terminal or gateway, etc. Additionally, the CPE 106 is also coupled to a digital video recorder (DVR) 528 and diplexer 530 via a coax cable or other connector. A network-to-coax bridge 531 places the coax environment in communication with a network (here, an Ethernet network complaint with IEEE Std. 802.3, although any number of other network protocols and topologies could be used) and a personal computer (PC) 532. The DVR 528 is also preferably connected to a television or other monitor 534, which may be in communication via a wired or wireless interface (e.g., cabling, PAN or IEEE 802.15 UWB micro-net, etc.).

A "home LAN" (HLAN) is created in the exemplary embodiment, which may include for example the network formed over the installed coaxial cabling in the premises, the Wi-Fi network, and so forth.

During operation, the CPE 106 exchanges signals with the CMTS 156, 199 over the interposed coax bearer medium and/or other connection means (e.g., optical fiber, etc.). The signals may include e.g., Internet traffic, digital programming and/or other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a media access controller (MAC) address or IP address can be used as the basis for directing traffic within the client-side environment 540.

Any number of different data flows may occur within the network depicted in FIG. 5. For example, the CPE 106 may exchange digital telephone signals from the CMTS 156, 199 which are further exchanged with the telephone unit 522 or the Wi-Fi phone 524. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as, for example, a 3G IMS (IP multimedia subsystem) system, in order to provide multimedia calls between a user or consumer in the household domain 540 (e.g., using a SIP phone or H.323 terminal) and a mobile 3G telephone or personal media device (PMD) user via that user's radio access network (RAN). See, e.g., U.S. Patent Publication 2007-0094691 entitled "Method And Apparatus For On-Demand Content Transmission And Control Over Networks" of Robert Gadzinski, filed Oct. 24, 2005, which is expressly incorporated herein by reference in its entirety for all purposes, wherein media can be streamed between a mobile unit and user CPE 106, including optionally in an on-demand or session-based fashion.

For example, content downloaded to the CPE 106 of FIG. 5 herein could be streamed "on demand" to a mobile user, and similarly that mobile user (with proper authentication, etc.) could stream content captured by the mobile device to the CPE 106 for later viewing by that user, or by others within that user's family or "circle" of authorized viewers (sharing). So-called Push-to-talk (PTT) or "Push-to-anything" (PTx) session-based systems can also be used consistent with the invention, such as where a SIP-based device pushes a video clip or other media file to another device using an instantaneously generated SIP session over a 3G IMS or similar bearer coupled with a client device in the user domain 540.

The CPE 106 may also exchange Internet traffic (e.g., TCP/IP and other packets) with the CMTS 156, 199 which is further exchanged with the Wi-Fi laptop 526, the PC 532, or other device by way of a diplexer 530 and the exemplary coax bridge 531. CPE 106 may also receive digital programming that is forwarded to the DVR 528 or to the television 534. Programming requests and other control information may be received by the CPE 106 and forwarded to the CMTS 156, 199 as well. The CMTS 156, 199 routes the information to the corresponding subsystem within the headend 150 or to other systems located upstream from the CPE 106 (such as, for example, the switching hub in a BSA network).

In another embodiment of the invention, a personal video encoder (PVE) or comparable device is used as part of or is in communication with the CPE 106 (or an associated client device coupled thereto). For example, a Slingbox™ (a registered trademark of Sling Media, Inc., Foster City, Calif.) device manufactured by Sling Media, Inc. is one non-limiting example of a device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as he or she has access to the IP distribution network. This functionality can be made part of a separate physical component, or alternatively have some or all of its functionality disposed within the CPE 106 itself. It may also be integrated with other devices (such as connected client devices or PMDs) as previously noted.

It will be appreciated that the PVE may also be updated itself via the network or other mechanism in terms of capabilities. For example, the PVE can receive new codecs or conditional access (CA) key data from the network so that it can modify its own configuration. These "upgrades" can also be passed through to the subscriber viewing device (e.g., remote PC).

It will also be recognized that the present invention may be used in conjunction with a number of different capabilities and features useful with traditional (prior art) CPE; for example, the error logging and reporting methods and apparatus described in U.S. Pat. No. 7,266,726, of Ladd et al., entitled "Methods and Apparatus for Event Logging in an Information Network" filed Nov. 24, 2003, which is expressly incorporated herein by reference in its entirety for all purposes. The aforementioned disclosure describes methods and apparatus (including APIs) for logging errors that occur on client devices or CPE 106. In the present context, these errors can then be transmitted upstream to a responsible entity (e.g., management node, conditional access server, etc.) for further analysis or correction.

Similarly, the hardware registry apparatus and methods described in U.S. Patent Publication 20050114900 of Ladd et al., entitled "Methods and Apparatus for Hardware Registration in a Network Device" filed Nov. 24, 2003, also incorporated herein by reference in its entirety for all purposes, may be used, as described in the aforementioned Markley publication. The CPE 106 described herein may either be of third-party or leased origin, and hence may benefit under either model when used in conjunction with the foregoing hardware registry approach.

The software interface management apparatus and methods described in co-owned and co-pending U.S. Patent Publication 20060020950 of Ladd et al., filed Jun. 30, 2004 and entitled "Apparatus And Methods For Implementation Of Network Software Interfaces", also incorporated herein by reference in its entirety for all purposes, can be used within the CPE 106 or associated devices, as described in the aforementioned Markley publication.

In another aspect, the CPE 106 of the present invention is also compatible with the methods and apparatus disclosed in U.S. Patent Publication 20070204314 of Hasek et al., filed Feb. 27, 2006 and entitled "Methods And Apparatus For Selecting Digital Access Technology For Programming And Data Delivery", which is expressly incorporated herein by reference in its entirety for all purposes, as described in the aforementioned Markley publication.

There is a great deal of video web content available—people access the AT&T U-verse service, Verizon FiOS Internet, and so on. People can obtain access through portals such as vodcasts.tv and watch the content through their PCs, but they cannot at present obtain access to this material through STBs. Video web content may, in some instances, afford a variety of interesting and unusual content.

Publication may typically use the aforementioned RSS specification, wherein the user accesses a URL and pulls down a file encoded in XML. The XML provides text data describing each of the pieces of content that are available, locations of box art for display, actual media content, and some descriptors describing the content. However, PCs mainly have content including MPEG4 Section 2, which is an earlier version of MPEG. More advanced boxes may use MPEG4 Section 10, also called H.264. As noted above, other available formats include .MOV, MPEG2, ADI and the like.

STBs, especially older ones, can only play content that is in the form of MPEG2 transport streams. Accordingly, with continued reference to FIG. 4, one or more embodiments of the invention provide a mechanism for determining which URL it is desired to obtain content from, and then when a request to obtain that content is transmitted, the content is first received by proxy server 404 and then the proxy server 404 sends the request out to the Internet 406 through firewall/router 402.

In one or more embodiments, starting at 410, the STB sends a request, via CMTS 414 and router 412, to advise proxy server 404 that a particular RSS feed is desired. The proxy server 404 accesses the internet (web) 406 through firewall/router 402 and obtains an "RSS.XML" file and parses it, examining the content therein. When the content is something that can be directly used by the STB 410, the proxy server 404 provides the content directly back to the STB. In this instance, proxy server 404 is essentially operative in a bypass mode, wherein data is passed from the firewall/router 402 to the STB 410 without format conversion. On the other hand, when the content in the RSS.XML file is in a form unusable by the STB 410, proxy server 404 intercepts such content and passes the data to media converter/cache 408, where the content is transcoded, or alternatively converted from a first format (e.g., ADI format) to a second format (e.g., MPEG-2 transport stream) which is suitable for use by the STB 410.

The converted content may be at least temporarily stored (cached) in media converter/cache 408 and then a suitable routine (located, for example, on media/converter cache server 408 or in operative communication therewith) takes the original RSS.XML document and substitutes the URLs of the original content with URLs that are now contained within the media converter/cache 408. At that point, the RSS.XML file is passed back to the STB 410. The STB 410 then obtains the substituted URLs from the media converter/cache 408 and attempts to play the content corresponding to those substituted URLs. Thus, rather than obtaining the content directly through the Internet 406, the STB 410 obtains the content through the media converter/cache 408, comprising the transcoded content, which is then played (e.g., displayed) on the STB 410 in a format suitable for the STB.

Furthermore, since a MSO is paying for the equipment to do the conversion, the MSO may choose to add bookend advertisements from advertisement server 416, which may be operatively coupled to the media converter/cache 408, as previously described. Advertisement server 416 may be, for example, another server which, once the content is converted, appends a prescribed advertisement (or multiple advertisements) on the front and/or back ends of the video content. In addition to, or in place of, commercial advertisements, server 416 may be employed for appending additional information to the video content, such as, but not limited to, public service announcements (PSAs) and the like. In FIG. 4, the STBs 410 preferably reside in the premises (as part of the CPE), the DOCSIS link is over the HFC network (101 shown in FIG. 1), or similar network, and everything else (i.e., elements 402, 404, 408, 412, 414 and 416) resides in the headend (except for element 406, which represents the Internet).

One or more embodiments may be employed with STBs using Cable Television Laboratories, Inc. "tru2way" technology which are homogeneous in their ability or inability to decode content, and thus, in one or more embodiments, the user does not have to provide a profile of what type of content he or she will be using.

Figure 6:
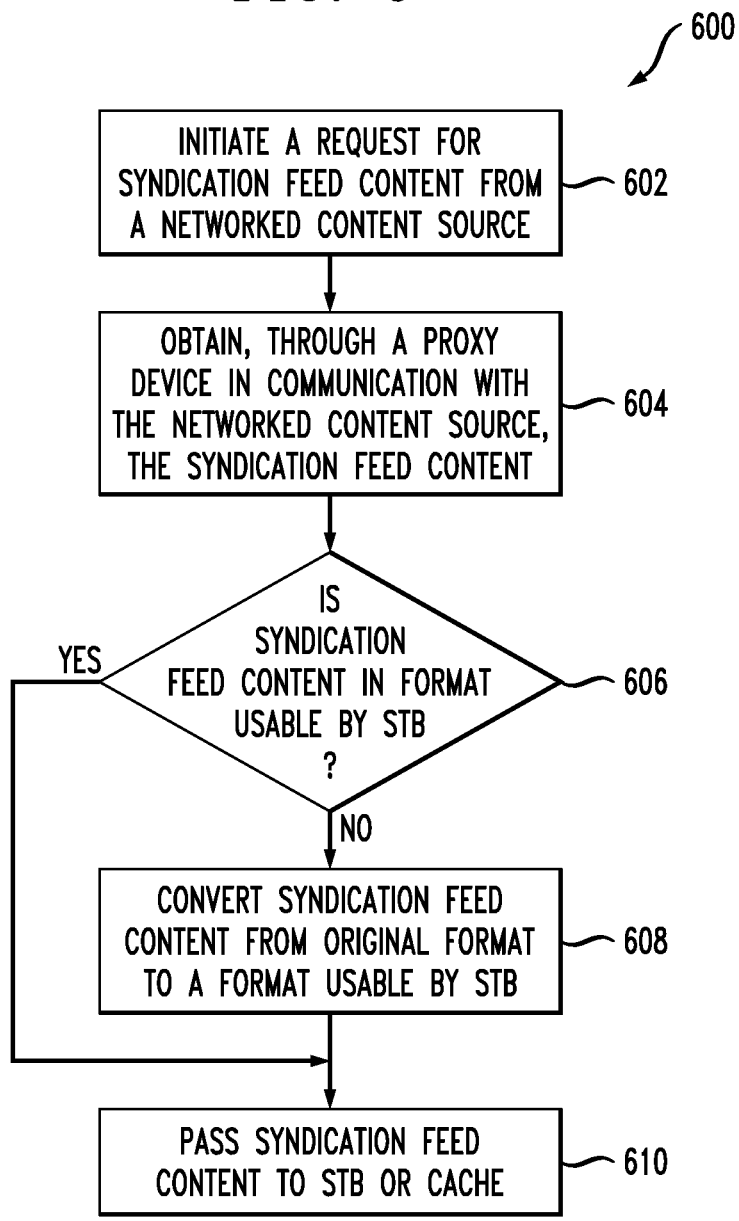
FIG. 6 illustrates at least a portion of an exemplary method for providing syndication feed content on CPE such as a STB, according to one embodiment of the invention.

FIG. 6 illustrates at least a portion of an exemplary method 600 for providing at least one syndication feed, which may be, for example, a RSS feed, on CPE such as a STB, according to one embodiment of the invention. As shown in the figure, the exemplary method 600 preferably begins at step 602 by initiating a request for syndication feed content from a networked content source. The request may be initiated through, for example, the STB, a server (e.g., network server), or a Web-based interface, although alternative means for initiating the request for syndication feed content are similarly contemplated (e.g., timer-based). In the case of a server implementation, a user profile running on the server may be used to configure the server to automatically parse content residing thereon for syndication feed (e.g., RSS) content and to download the syndication feed content to the STB.

In step 604, the syndication feed content is obtained from the networked content source (e.g., the Internet 406) through a proxy device (proxy server 404) in communication with the networked content source (see FIG. 4). The proxy device is preferably in communication with the networked content source through a firewall/router, or alternative security protection means, as previously described. Once the proxy device obtains the syndication feed content, the content is checked to determine whether or not it is in a first format usable by the STB in step 606.

When it is determined, in step 606, that at least a portion of the syndication feed content is not in a first format suitable for use with the STB, the syndication feed content which is not in a usable format is converted, in step 608, to a second format which is usable by the STB. This may be accomplished, in one embodiment, by parsing the syndication feed content to determine which portion of the content is in the first format and which portion is in the second format, and then generating a modified syndication feed content by replacing the portion of the content that is in the second format with corresponding content that is in the first format.

The converted syndication feed content is then passed to the STB or cached in step 610 where it can be further processed, stored, presented, etc. When it is determined, in step 606, that the syndication feed content is in the first format suitable for use with the STB, the syndication feed content is simply passed, in its original format (i.e., without conversion), to the STB or cache in step 610.

In accordance with one or more other embodiments, techniques of the invention are employed in conjunction with an exemplary system for providing at least one syndication feed (e.g., a RSS feed) on a vehicle entertainment system, or other mobile computing device (e.g., PDA, mobile phone, etc.).

Vehicles use compact disks (CDs), audio tapes, digital video disks (DVDs) and the like for adding and playing video and audio in the vehicles. These vehicles can be commercial tour buses, airplanes, boats, or automobiles with video entertainment systems (e.g., mounted in the backs of seats) to keep passengers entertained. However, much of the new video and audio is being transferred as audio and video encoded files using the MPEG-1 Audio Layer 3 (MP3), MPEG-2, MPEG-4, and other encoding methods. Many customers use RSS, or an alternative syndication feed, to obtain content they wish to view or listen to for entertainment. Customers download the content onto their personal computers or home television STBs and transfer it to their personal mobile devices. One or more embodiments of the invention use wireless technology to enable the user to set up a RSS feed accumulator and automatically transfer the content wirelessly (or wired) to the vehicle or personal mobile device.

Figure 7:
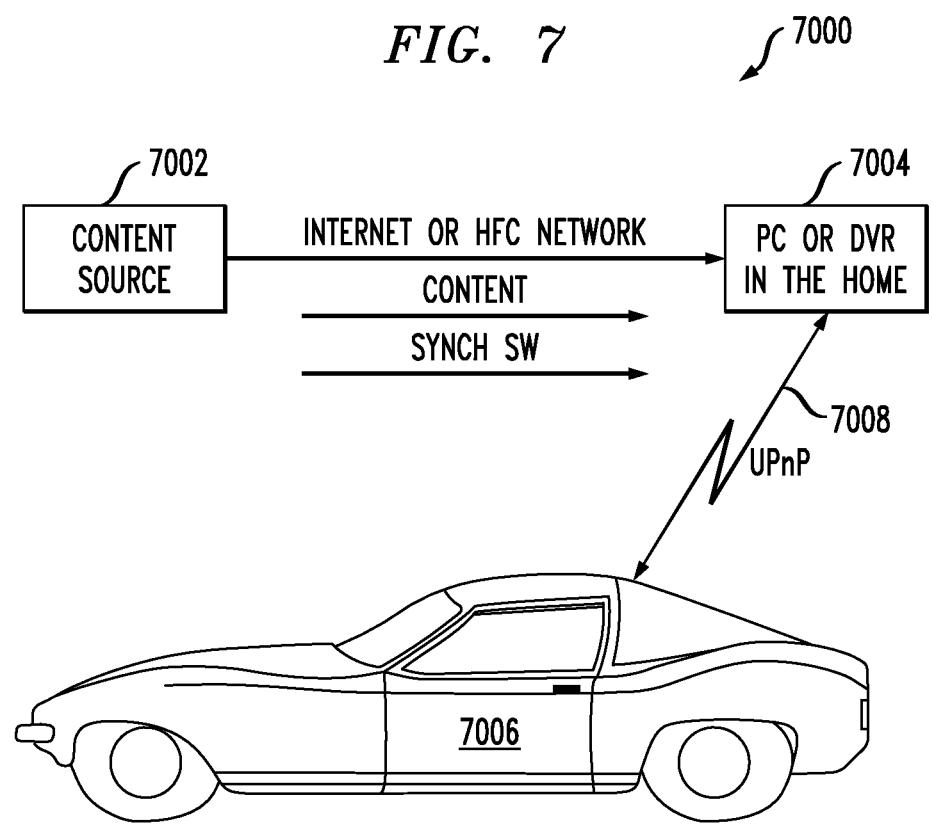
FIG. 7 illustrates at least a portion of an exemplary system for transferring information between a first component, which may reside in a home or business, and a second component, which may reside in a vehicle or other mobile device, according to one embodiment of the present invention.

With reference now to FIG. 7, at least a portion of an exemplary system 7000 is shown for transferring information (e.g., streaming video content, syndication feeds, etc.) between a first component residing in a first location, which may be a home or business 7004, and a second component residing in a second location which is mobile, such as a vehicle or other mobile device 7006, using a communication protocol, such as, for example, Universal Plug and Play (UPnP), according to one embodiment of the invention. UPnP is a networking protocol promulgated by the UPnP Forum known by those skilled in the art. It is to be understood that the present invention contemplates other standard, as well as non-standard, communication protocols for facilitating the transfer data between two or more devices.

In the embodiment shown, the first component resides in a fixed/stationary location while the second component resides in a mobile location. It is to be appreciated, however, that either of the first and second components may be either stationary or mobile. For example, techniques of the invention may be advantageously employed to transfer content from one vehicle system to another vehicle system, in which case both the first and second components would be mobile. Moreover, although the transfer of information between the first and second components can be performed via a wireless communication link 7008, a wired communication link can also be used, in accordance with other embodiments. For example, if one vehicle system provides a wireless link and another vehicle system does not, a wired link could be extended between the two vehicles to facilitate the content transfer.

Content to be transferred between the two components may be obtained from a content source 7002 which preferably resides externally to the home 7004 and vehicle 7006. Alternatively, the content source 7002 can reside within the home 7004, according to other embodiments of the invention, such as in a multimedia storage device operatively coupled to a STB in the home. If the content source is the STB, such content may be encrypted using a known content protection scheme such as, for example, Digital Transmission Content Protection over IP (DTCP-IP). DTCP-IP, which is part of the Digital Living Network Alliance (DLNA), is a specification which provides protection from unauthorized use and copying of copyrighted material that is transferred over digital interfaces in home networks that adhere to IP. (In March 2006, DLNA Networked Device Interoperability Guidelines and guidelines for related media formats were given the status of international standards with the publication of IEC 62481-1 and IEC 62481-2 by the International Electrotechnical Commission (IEC), which are incorporated herein by reference in their entirety for all purposes.)

Content transferred between the home 7004 and vehicle 7006 via link 7008 may comprise, for example, RSS information, or alternative syndication feed content, although the invention is not limited to the transfer of syndication feed content. Such content may comprise, but is not limited to, video content, audio content, graphical content, application data or executable software used to update or enhance some feature of the receiving device, etc. Graphical content may comprise such useful items as maps, dining menus, hotel accommodation information, etc.

The illustrative system 7000 will be described in further detail herein below. Specifically, a first portion 7004 of the system 7000 residing inside of the home (i.e., home portion) or business preferably comprises a microcomputer device with a RSS accumulator, a storage component, a user interface, an Internet connection (or other connection means), a UPnP server, and an IEEE 802.11n wireless Internet (Wi-Fi) connection, or alternative connection means. This device may be, for example, a television STB, a digital video recorder (DVR) or a PC. A second portion 7006 of the system 7000 residing inside the vehicle (i.e., vehicle portion) preferably comprises a microcomputer system with a storage component, IEEE 802.11n Wi-Fi connection, or alternative connection means, and a UPnP server. The home portion 7004 preferably obtains content from the content source 7002 (e.g., cable MSO) over the Internet or a content network, such as, for example, an HFC network. In other embodiments, content from the STB residing in the home portion 7004 may also be used, as will be described in further detail below. The home portion 7004 also obtains software from content source 7002 which allows for synchronization with the portion of the system inside the vehicle 7006.

During operation of one or more embodiments, a user configures the RSS accumulator to download the desired content onto the home portion 7004 from the content source 7002 on the Internet or intranet connected to the cable system or other network provider. The user turns on his or her vehicle entertainment system and, through a button or some other input device, enables the UPnP server and IEEE 802.11n Wi-Fi connection therein. A PC or STB UPnP control point discovers the vehicle entertainment system UPnP device using a known device discovery methodology.

Alternatively, content from the STB may be used, such as, for example, a recorded television program. Recorded content on the STB will typically be DTCP-IP encrypted and will preferably be "moved" rather than "copied," depending upon copy protection settings corresponding to the content. For instance, certain content on the STB may have "copy once" or "copy multiple" entitlements corresponding thereto. If the content setting is "copy once," then only one copy of the original recorded program is allowed (e.g., the copy residing on the STB). In this instance, in order to transfer the content from the home portion 7004 (e.g., STB) to the vehicle portion 7006, the content must be moved, rather than copied, to the vehicle portion.

The vehicle entertainment system device in vehicle 7006 is preferably operative to perform a first service, which may be a service "copy," for copying data received by the device. Furthermore, the vehicle entertainment system device is operative to perform a second service, which may be a service "display," for displaying a content directory or other information. The vehicle entertainment system device is preferably further operative to perform a third service, which may be a service "delete," for deleting prescribed content from the device.

A user interface associated with the PC or STB in the home portion 7004 preferably has access to a control point within the UPnP agent in the PC or STB that controls the content directory service "display" on the vehicle system device in the vehicle portion 7006 and requests a listing of the current contents. The user interface has access to a control point within the UPnP agent in the PC or STB that controls the deletion of content stored on the vehicle entertainment system in vehicle 7006 by invoking the "delete" service. Furthermore, the user interface has access to a control point within the UPnP agent in the PC or STB that controls copying of the content from the PC or set top box into the storage unit of the vehicle entertainment system by invoking the "copy" service from the entertainment device. Content may also be moved from the vehicle entertainment system in the vehicle portion 7006 back to the STB in the home portion 7004, assuming the content has "copy once" entitlements corresponding thereto.

Alternately, the vehicle entertainment system may have a single button associated therewith that is operative to initiate an update of all the content in the entertainment system in vehicle 7006 with the most recent content from the RSS accumulator in the PC or STB 7004. The UPnP agent in the vehicle entertainment system copies the content from the PC or STB to the entertainment system. Once the content has been transferred, it may be played out on the vehicle entertainment system, such as via audio and/or video decoders therein.

It should be noted that the content provided to the vehicle 7006 may include, but is not limited to, RSS content, which may be downloaded to the PC or STB 7004 and transferred to vehicle 7006. The content could be any kind of content sold, leased, or given away by content source 7002 (e.g., audio tunes, etc.). A proprietary mechanism to obtain content to STB 7004 may be employed in some instances, according to one or more embodiments of the invention.

Content source 7002 may comprise any entity (e.g., cable MSO, web-based seller of MP3 files, and the like) who provides multimedia content, such as by selling content, leasing content, or giving away free content (e.g., shareware), who provides a service that is then operatively connected through the home PC or STB 7004 and then allows use of UPnP, or an alternate connection means, to transfer the content into the vehicle 7006.

In some embodiments, element 7004 comprises a DVR and content provided to vehicle 7006 may include something recorded on the DVR (recorded content is exposed to the UPnP network). In addition to the content ultimately transferred to vehicle 7006, content source 7002 may provide software to the PC or STB 7004 that allows synchronization ("synching up") of content with the vehicle 7006.

The Digital Living Network Alliance (DLNA) is an international, cross-industry collaboration of consumer electronics, computing industry and mobile device companies. One or more embodiments may employ a DLNA interoperability framework and design guidelines. Vehicle 7006 may employ UPnP and/or DLNA functionality and may expose itself as a renderer in UPnP language and each device may have a suitable content store.

Figure 8:
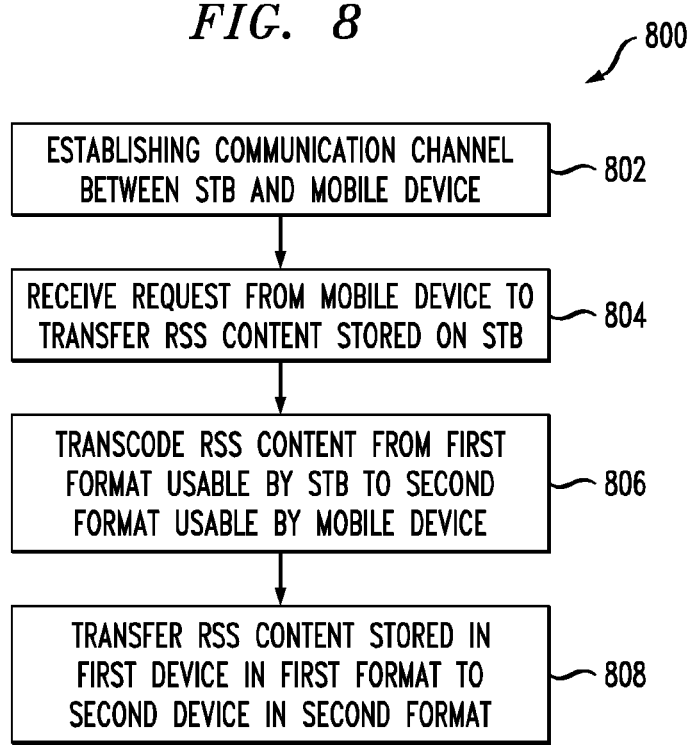
FIG. 8 illustrates at least a portion of an exemplary method for transferring syndication feed content between a STB and a mobile device, according to one embodiment of the invention.

FIG. 8 illustrates at least a portion of an exemplary method 800 for transferring syndication feed content (e.g., RSS feed content) between a first device, which may comprise, for example, a STB or a PC, residing at a first location (e.g., home), and a second device, which may comprise, for example, a mobile or hand-held device, residing at a second location (e.g., in a vehicle entertainment system or portable hand-held device residing outside the home), according to one embodiment of the invention. The exemplary method assumes that the syndication feed content has been previously obtained from a networked content source (e.g., the Internet) and stored locally on the first device (e.g., STB), such as, for example, using techniques of the invention described herein.

In order to transfer information between the STB and the mobile device, method 800 preferably begins by establishing a communication channel between the two devices in step 802. In the case of a wired communication link, this step may include physically connecting the STB to the mobile device, such as with a cable or alternative connection means. In the case of a wireless connection arrangement, the devices may be adapted to recognize one another, such as by using a device discovery methodology (e.g., UPnP, Bluetooth, etc.) known by those skilled in the art. A wireless local area network (WLAN) can also be established for wirelessly connecting the devices, according to known methods. Although communication between only two devices is described herein, one skilled in the art will readily appreciate that the transfer of syndication feed information from the STB to two or more other devices can be similarly achieved given the teachings herein.

In step 804, a request is received by the STB to initiate the transfer of at least a portion of the syndication feed content stored locally thereon to the mobile device. This request is preferably sent by the mobile device, although the request may alternatively be initiated by another entity, such as, for example, a Web-based interface. In step 806, the STB converts (e.g., transcodes) the syndication feed content from a first format usable by the STB, and residing locally on the STB, to a second format usable by the mobile device.

As is often the case, the mobile device (due, perhaps in part, to its limited size and low power requirements) will not have the processing capability to play syndication feed content with the same resolution, speed, etc., as the available from the STB. Thus, as part of the conversion process, the syndication feed content is preferably adapted according to the capability of the device to which it is being transferred. In step 808, the STB transfers the modified syndication feed content to the mobile device for presentation on a display associated with the mobile device.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 9:
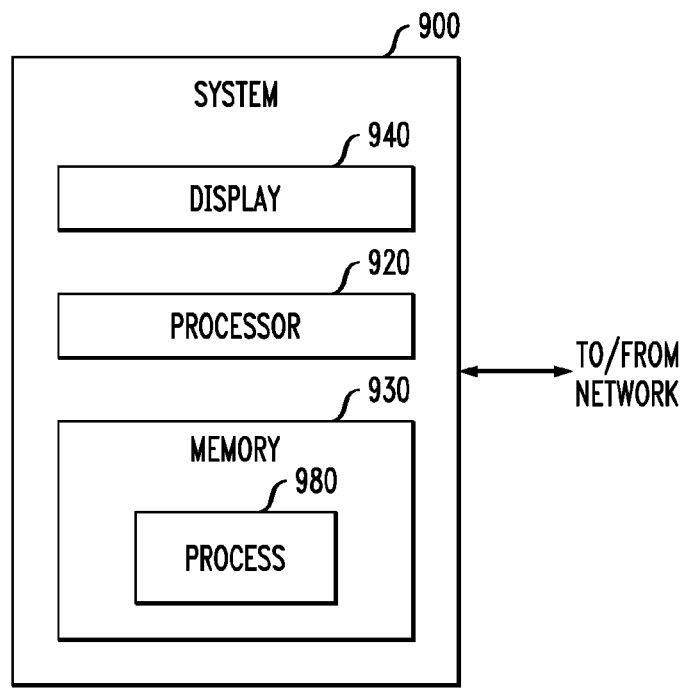
FIG. 9 is a block diagram of an exemplary system operative to implement at least a portion of one or more aspects of the present invention.

FIG. 9 is a block diagram of an exemplary system 900 operative to implement at least a portion of one or more aspects or processes of the present invention, processor 920 of which is representative of processors associated with servers, clients, and other elements with processing capability depicted in the other figures (e.g., application distribution servers 104, VOD server 105, CPE 106 with processing unit 905, a processor of the server in FIG. 2 which executes the process 202, and so on). In one or more embodiments, inventive steps are carried out by one or more of the processors in conjunction with one or more interconnecting network(s).

As shown in FIG. 9, memory 930 configures the processor 920 to implement one or more aspects of the methods, steps, and functions disclosed herein (collectively, shown as process 980 in FIG. 9). The memory 930 could be distributed or local and the processor 920 could be distributed or singular. The memory 930 could be implemented as an electrical, magnetic or optical memory, or any combination of these or other types of storage devices. It should be noted that if distributed processors are employed, each distributed processor that makes up processor 920 generally contains its own addressable memory space. It should also be noted that some or all of computer system 900 can be incorporated into an application-specific or general-use integrated circuit. For example, one or more method steps could be implemented in hardware in an ASIC rather than using firmware. Display 940 is representative of a variety of possible input/output devices.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 900 as shown in FIG. 9) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/submodules for server process 202, client process 204, applications and modules in FIG. 3, modules to implement functionality of the blocks in FIGS. 6 and 8, and so on). The method steps can then be carried out using the distinct software modules of the system, as described above, executing on the one or more hardware processors (e.g., a processor or processors in the client and a processor or processors in the server). Further, a computer program product can include a tangible computer-readable recordable storage medium with code adapted to be executed to carry out one or more method steps described herein, including the provision of the system with the distinct software modules.

Non-limiting examples of languages that may be used include markup languages (e.g., hypertext markup language (HTML), extensible markup language (XML), standard generalized markup language (SGML), and the like), C/C++, assembly language, Pascal, Java, Enhanced TV Binary Interchange Format (EBIF), and the like.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for transferring syndication feed content between a first device residing in a first location and a second device residing in a second location, the method comprising the steps of:
    establishing a communication channel between the first and second devices for transferring information between the first and second devices;
    the first device receiving a request to transfer at least a first portion of the syndication feed content stored on the first device to the second device;
    the first device converting the first portion of the syndication feed content from a first format to a second format usable by the second device, the converting comprising modifying at least a first portion of metadata in a syndication feed referencing the syndication feed content so that the first portion of the metadata no longer references content stored on a networked content source but references the first portion of the syndication feed content stored locally on the first device as converted syndication feed content, and wherein at least a second portion of the syndication feed content stored on the networked content source, and which is useable by the second device, is referenced by a second portion of the metadata in the syndication feed; and
    transferring at least the first portion of the syndication feed content stored in the first device to the second device in the second format.

2. The method of claim 1, wherein the first device is operative to communicate with the second device via a wireless communication channel.

3. The method of claim 1, wherein the first device is operative to communicate with the second device via a Universal Plug and Play (UPnP) communications protocol.

4. The method of claim 1, wherein the step of converting the syndication feed content from the first format to the second format usable by the second device comprises:
    parsing a file of the syndication feed content at a proxy device to determine the first portion of the syndication feed content in the first format and the second portion of the syndication feed content in the second format;
    generating the converted syndication feed content by replacing the first portion of the syndication feed content that is in the first format with the converted syndication feed content that is in the second format, using the first device, wherein the first device is a media converter; and
    passing the converted syndication feed content to the second device in response to the request, wherein the second device is a television set-top box (STB),
    wherein replacing the first portion of the syndication feed content that is in the first format comprises:
    generating the converted syndication feed content that is in the second format;
    storing the converted syndication feed content that is in the second format in a memory associated with the proxy device; and
    modifying at least the first portion of metadata in the syndication feed content so that the first portion of the metadata no longer references syndication feed content stored on the networked content source but references the converted syndication feed content stored on the memory associated with the proxy device.

5. The method of claim 4, wherein the step of converting the syndication feed content from the first format to the second format further comprises storing the converted syndication feed content.

6. The method of claim 5, wherein the step of storing the converted syndication feed content comprises storing the converted syndication feed content in the memory associated with the proxy device.

7. The method of claim 4, wherein the step of generating the converted syndication feed content further comprises inserting at least one advertisement into the converted syndication feed content.

8. The method of claim 4, further comprising initiating the request to transfer at least the first portion of the syndication feed content through the STB.

9. The method of claim 4, further comprising storing at least a portion of the syndication feed content prior to passing the syndication feed content to the STB.

10. A method for transferring syndication feed content between a first device residing in a first location and a second device residing in a second location, the method comprising the steps of:
    establishing a communication channel between the first and second devices for transferring information between the first and second devices;
    the first device receiving a request to transfer at least a first portion of the syndication feed content stored in a memory of the first device;
    a processor of the first device converting the first portion of the syndication feed content from a first format to a second format usable by the second device, the converting comprising modifying at least a first portion of metadata in a syndication feed referencing the syndication feed content stored on a networked content source to reference the first portion of the syndication feed content stored locally in the memory the first device as converted syndication feed content, and wherein at least a second portion of the syndication feed content stored on the networked content source, and which is useable by the second device, is referenced by a second portion of the metadata in the syndication feed;

storing the first portion of syndication feed content in the second format in the memory of the first device; and transferring at least the first portion of the syndication feed content in the second format stored in the memory of the first device to a memory of the second device.

11. The method of claim 10, wherein the first device is operative to communicate with the second device via a wireless communication channel.

12. The method of claim 10, wherein the first device is operative to communicate with the second device via a Universal Plug and Play (UPnP) communications protocol.

13. The method of claim 10, wherein the step of converting the syndication feed content from the first format to the second format usable by the second device comprises:

parsing a file of the syndication feed content at a proxy device to determine the first portion of the syndication feed content in the first format and the second portion of the syndication feed content in the second format;

generating the converted syndication feed content by replacing the first portion of the syndication feed content that is in the first format with the converted syndication feed content that is in the second format, using the processor of the first device, wherein the first device is a media converter; and passing the converted syndication feed content to the second device in response to the request, wherein the second device is a television set-top box (STB), wherein replacing the first portion of the syndication feed content that is in the first format comprises:

generating the converted syndication feed content that is in the second format;

storing the converted syndication feed content that is in the second format in a memory associated with the proxy device; and modifying at least the first portion of metadata in the syndication feed referencing content stored on the networked content source to reference the converted syndication feed content stored in the memory associated with the proxy device.

14. The method of claim 13, wherein the step of converting the syndication feed content from the first format to the second format further comprises storing the converted syndication feed content.

15. The method of claim 14, wherein the step of storing the modified syndication feed content comprises storing the converted syndication feed content in the memory associated with the proxy device.

16. The method of claim 13, wherein the step of generating the converted syndication feed content further comprises inserting at least one advertisement into the modified syndication feed content.

17. The method of claim 13, further comprising initiating the request to transfer at least the first portion of the syndication feed content through the STB.

18. The method of claim 13, further comprising storing at least a portion of the syndication feed content prior to passing the syndication feed content to the STB.

19. A method for transferring syndication feed content between a first device residing in a first location and a second device residing in a second location, the method comprising the steps of:

establishing a communication channel between the first and second devices for transferring information between the first and second devices;

the first device receiving a request to transfer at least a portion of the syndication feed content stored on the first device in a first format, the first format being different than a format of the syndication feed content obtained by the first device from a networked content source;

the first device converting the syndication feed content from the first format to a second format usable by the second device, the converting comprising modifying at least a portion of metadata in the syndication feed so that the metadata no longer references content stored on the networked content source but references content stored locally on the first device; and transferring at least a portion of the syndication feed content stored in the first device in the first format to the second device in the second format, wherein the step of converting the syndication feed content from the first format to the second format usable by the second device comprises:

parsing a file of the syndication feed content at a proxy device to determine a first portion of the content in the first format and a second portion of the content in the second format;

generating modified syndication feed content by replacing the first portion of the content that is in the first format with corresponding content that is in the second format, using the first device, wherein the first device is a media converter; and passing the modified syndication feed content to the second device in response to the request, wherein the second device is a television set-top box (STB), wherein replacing the first portion of the content that is in the first format comprises:

generating the corresponding content that is in the second format;

storing the corresponding content that is in the second format in a memory associated with the proxy device; and modifying at least a portion of metadata in the syndication feed content so that the portion of the metadata no longer references content stored on a networked content source but references content stored on the memory associated with the proxy device.

* * * * *